July 2, 1963  A. LATHAM, JR  3,095,907
SERVO VALVE
Filed April 21, 1958
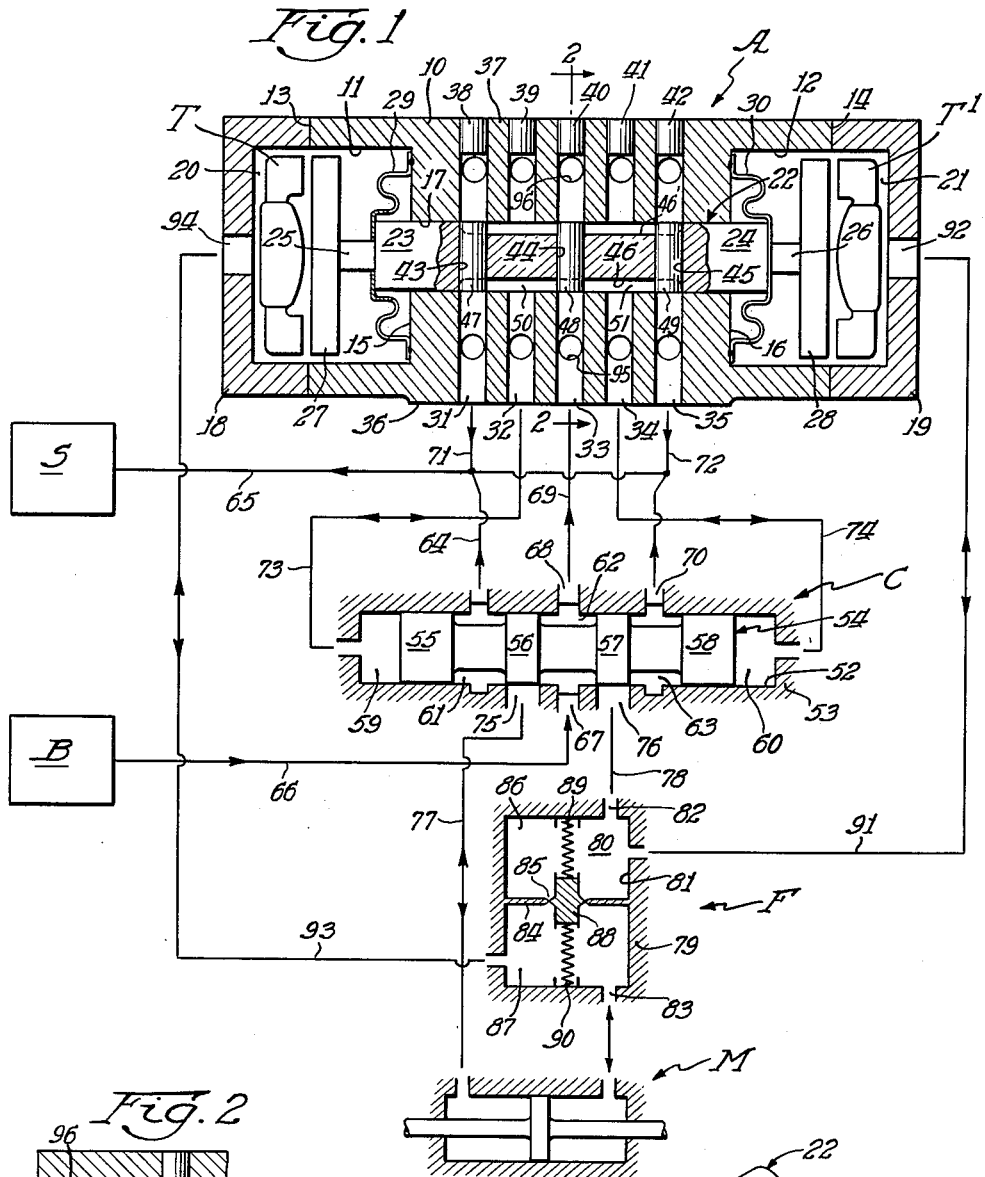
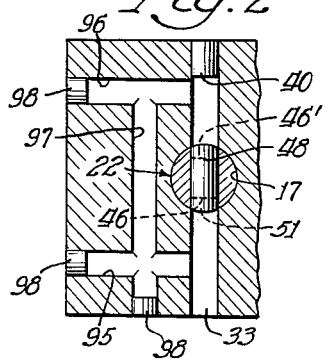
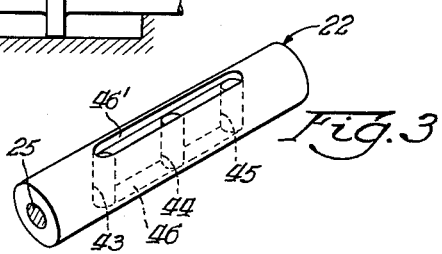
Inventor:
Allen Latham, Jr.
By: Frank C. Parker Atty.

United States Patent Office 3,095,907
Patented July 2, 1963

3,095,907
SERVO VALVE
Allen Latham, Jr., Jamaica Plain, Mass., assignor, by mesne assignments, to Borg-Warner Corporation, Chicago, Ill., a corporation of Illinois
Filed Apr. 21, 1958, Ser. No. 729,990
12 Claims. (Cl. 137—625.67)

This invention relates to servo valves, and, in particular, to a hydraulic control servo valve for controlling the flow of fluid to utilization means for actuation thereof in accordance with an electrical signal transmitted to the valve.

Systems have been developed in which a valve member of a control valve is moved a small distance by a relatively weak signal, such as an electrical impulse signal, whereby the control valve effects amplification of the control signal and converts the signal into a controlled flow of hydraulic fluid to a controlled valve effecting movement of a valve member thereof. Movement of the valve member of the controlled valve effects a flow of hydraulic fluid from a source of pressure fluid to a motor or other utilization device, the hydraulic flow being proportional to and in accordance with the strength of the particular control signal. Such hydraulic systems are well known as being utilized in modern aircraft where information is transmitted into the system in the form of electrical signals from electronic equipment, such as guidance and fire control computers of missiles and other armament equipment and navigational and flight control equipment. The electrical signal is derived from electrical computers and is fed to the servo valve or control valve to cause movement of the valve member thereof in a predetermined direction and magnitude of displacement, the direction and magnitude of displacement of the valve member being in response and proportional to that signal. The particular movement of the valve member of the servo valve effects movement of a valve member of a larger controlled valve which, in turn, interconnects a source of pressure fluid with the utilization device that is desired to be actuated in response to the control signal.

Since the control or servo valve is responsive to a relatively weak electrical signal, it is desirable that the moving parts of the control valve be relatively small so that a proportionate and accurate movement thereof may be obtained from the weak signal. The smaller the control or servo valve is made the greater the tendency for defects to occur therein. The tolerances of the particular structure of the servo valve must be accurately maintained as any misalignment of the parts thereof would cause leakage and malfunctioning thereof. Further, since the relatively small moving parts of the control valve are utilized to direct hydraulic pressure fluid, the moving parts are subject to the effect of the force of hydraulic fluid acting thereagainst. If the moving parts are not hydraulically balanced, they tend to frictionally engage the non-moving parts and are thus prevented from providing an accurate movement in relation to the control signal.

It is, therefore, an object of this invention to provide a control or servo valve which is adapted to have a valve member thereof moved in accurate proportion with respect to a relatively weak control signal fed to the valve.

It is another object of this invention to provide a servo valve having a piston therein which is subject to axial movement in response to a relatively weak control signal.

It is another object of this invention to provide a servo valve having a piston therein which is axially movable in response to a control signal whereby the piston is adapted to interconnect a source of pressure fluid with one utilization means and simultaneously interconnect another utilization means with a sump.

A further object of this invention is to provide a servo valve having a hydraulically balanced piston therein which is subject to axial movement in response to a relatively weak control signal, the piston thereby being adapted to direct a flow of hydraulic pressure fluid in relation to the control signal without being subject to the effect of the force of the pressure fluid controlled thereby.

Other and more particular objects, uses, and advantages of this invention will become apparent upon a reading of the following specification taken in connection with the accompanying drawing which forms a part thereof and wherein:

FIGURE 1 illustrates a control valve, in axial cross-section and in an enlarged scale incorporated in a hydraulic system that is shown schematically.

FIGURE 2 is a sectional view of the control valve illustrated in FIGURE 1 taken on line 2—2 thereof.

FIGURE 3 is a perspective view of the control valve piston utilized in the control valve illustrated in FIGURE 1.

Reference is made to the drawing wherein like reference numerals are used throughout to designate like parts in the various figures thereof, and, particular reference is made to FIGURE 1 which illustrates a hydraulic control system which may be utilized as a control system for effecting movement of a particular aircraft mechanism in response to information in the form of an electrical signal received from an electronic computer. It is to be understood that the system illustrated in FIGURE 1 is not limited only to aircraft applications but is adapted to be utilized for many other types of applications. The system comprises a servo or control valve, generally indicated by reference letter A, which is adapted to interconnect a pressure fluid source B with a controlled valve, generally indicated at C, to effect axial movement of the controlled valve C which movement interconnects the pressure fluid source B with a utilization device or motor M. The flow of the pressure fluid from the controlled valve C to the utilization device is in response to a predetermined electrical signal effecting proportionate movement of the control valve A. In this manner, the piston of the motor M is moved in a predetermined direction and for a predetermined distance to correspond to the particular electrical signal fed to the control valve A. If it is desired that the control system depicted in FIGURE 1 is to be utilized in a navigational system of an aircraft, the motor M may be adapted to actuate a movable airfoil thereof, such as the rudder. The navigational computer sensing a deviation of the aircraft from a predetermined flight course will send the information of the deviation in the form of an electrical impulse to the control valve A. The control valve A will be moved axially in accordance with the electrical signal and cause a corresponding movement of the controlled valve C to thereby interconnect the source B with the motor M to effect movement of the piston thereof. The movement of the motor piston causes a movement of the aircraft rudder in the desired direction and for a predetermined distance to compensate for the deviation sensed by the nagivational computer and thus returns the aircraft to its predetermined flight course.

The control valve A comprises a housing 10 having a pair of coaxial, opposed, like bores 11 and 12 interrupting respectively, opposed ends 13 and 14 of the housing 10. Each bore 11 and 12 terminates at a predetermined distance within the housing 10. The bore 11 forms an end wall 15 in the housing 10 and the bore 12 forms an end wall 16 in the housing 10. Another bore 17, having a diameter smaller than the diameters of the bores 11 and 12, is formed in the housing 10, coaxial with bores 11 and 12, and passes through both end walls 15 and 16 of the housing 10.

A pair of cover members or cup-shaped end caps 18 and 19 are adapted to be respectively fastened by any suitable means to the ends 13 and 14 of the housing 10. The cover members 18 and 19 cooperate respectively with the housing 10 and bores 11 and 12 to form sealed chambers 20 and 21.

An elongated cylindrical piston 22 is disposed within the bore 17 of the housing 10. Opposed ends 23 and 24 of the piston 22 are each adapted to project respectively beyond the end walls 15 and 16 of the housing 10 when the piston 22 is centered within the bore 17. Piston 22 is formed with a predetermined diameter of such a dimension in relation to the diameter of the bore 17 of the housing 10 that the piston 22 is adapted to be in sealing relation with the internal surface of the housing 10, defined by the bore 17, and still be adapted to be movable relative to the housing 10 within the bore 17.

A pair of shafts 25 and 26 are each adapted to be detachably connected respectively to the central portions of the ends 23 and 24 of the piston 22 and project coaxially and outwardly therefrom. Each shaft 25 and 26 is respectively connected to an armature 27 and 28 disposed within the respective chambers 20 and 21. It is to be understood that each armature 27 or 28 may be formed integrally with the respective shaft 25 or 26, or each armature may be formed separately and then be suitably fastened thereto.

Each end 23 and 24 of the piston 22 is adapted to respectively engage a flexible spring means 29 and 30. Each of the spring means 29 and 30 is attached at its outer end to the respective end wall 15 or 16. The springs 29 and 30 tend to maintain the piston 22 in a predetermined centered position relative to the housing 10. It is to be understood that although the shafts 25 and 26 of the armatures 27 and 28, respectively, are fastened to the ends 23 and 24 of the piston 22, the springs 29 and 30 may be adapted to be suitably journalled about the shafts 25 and 26 respectively by providing suitable apertures therein.

A pair of torque motors, indicated generally at T and $T^1$, are each disposed respectively in chambers 20 and 21 and may be suitably fastened to the respective end caps 18 and 19. The torque motors T and $T^1$ are each suitably connected by well known means to an electronic computer device (not shown) which is adapted to feed the particular torque motor an electrical signal when appropriate. If the electrical signal is transmitted to the torque motor T, the torque motor T effects movement of the armature 27 toward the torque motor T which in turn causes axial movement of the piston 22 toward the left, as viewed in the drawings. Similarly, an electrical impulse transmitted to torque motor $T^1$ effects axial movement of the piston 22 toward the right. The axial movement of the piston 22 is proportionate to the strength of the electrical impulse transmitted to the particular torque motor. The springs 29 and 30 tend to maintain the piston 22 in the predetermined centered relation with the housing 10 and upon termination of the electrical signal to either torque motor T or $T^1$ will effect the return of the piston 22 to that predetermined position.

A plurality of spaced parallel passage means 31, 32, 33, 34, and 35 are formed in the housing 10 interrupting a mounting surface 36 thereof. Each passage means 31, 32, 33, 34, or 35 interconnects surface 36 with the bore 17. When forming these passage means in the housing 10 by any well known means, such as a multiple drill head, each of the passage means 31—35 may not only be formed to interconnect surface 36 with the bore 17 but may pass completely through the housing 10 and interconnect the opposite surface 37 of the housing 10 with the bore 17 as illustrated in FIGURE 1. Each upper end of the passage means 31—35 may be sealed and closed off by a pin 38, 39, 40, 41, or 42 disposed respectively therein. The purpose of passage means 31—35 will be later described.

The piston 22 is provided with transverse, spaced, parallel bores 43, 44, 45, each of which has substantially the same diameter as the corresponding passages 31, 33, and 35. When the piston 22 is in its predetermined position relative to the housing 10, positioned therein by spring means 29 and 30, the transverse bore 43 is coaxial with the passage means 31, the transverse bore 44 is coaxial with the passage means 33, and the transverse bore 45 is coaxial with the passage means 35. One method of assuring an accurate coaxial alignment of the transverse bores 43, 44, and 45 with the respective corresponding passage means 31, 33, and 35 is to bore the transverse bores 43, 44, and 45 simultaneously through the piston 22 when the piston 22 is in its centered predetermined position within bore 17, using the passage means 31, 33, and 35 as the boring tool guide means. Also, the transverse bores 43, 44, and 45 could be formed when the passages 31, 33, and 35 are being formed.

The piston 22 is also provided with a pair of like, opposed longitudinal recesses or grooves 46 and $46^1$ formed medially of the ends 23 and 24 of the piston 22 (see FIGURE 3). Each medial groove 46 and $46^1$ interconnects the transverse bores 43, 44, and 45 with one another. The medial recesses or grooves 46 and $46^1$ each has a width smaller than, or at least the same size as, the diameters of the passages 31—35, and each extends longitudinally of the piston 22 from passage 31 to passage 35 when the piston 22 is in its predetermined position.

Pin means 47, 48, and 49 are each disposed in and are in sealing relation respectively with the transverse bores 43, 44, and 45 of the piston 22. The pin means 47, 48, and 49 are each formed with a diameter at least the same size as or greater than the diameter of the respective passages 31, 33, and 35. It should be understood that the axial lengths of the pin means 47, 48, and 49 are substantially the same as the diameter of the piston 22 and permit the piston to be moved relative to the housing 10 within the bore 17 thereof (see FIGURE 2) and yet are adapted to be in sealing relation with the internal surface of the housing 10, defined by the bore 17, in the same manner as piston 22.

The pin means 48 is formed with a diameter that is effective to divide each medial recess 46 and $46^1$ into two substantially equal sections 50 and 51, and $50^1$ and $51^1$ respectively. When the piston 22 is in its predetermined position relative to the housing 10, the pin means 48 is effective to prevent fluid communication between passage 33 and either of the adjacent passages 32 and 34. Pins 47 and 49 are also disposed in the respective transverse bores 43 and 45 so that when the piston 22 is in its predetermined position, pin means 47 prevents fluid communication between passage 31 and section 50 and thereby prevents fluid communication between passage 31 and passage 32, and, in a similar manner, pin means 49 prevents fluid communication between passage 35 and passage 34. Because the pin means 47, 48, and 49 have substantially the same size diameters as the corresponding passage means 31, 33, and 35 and yet prevent fluid communication, as above stated, when the piston 22 is in its predetermined position relative to the housing 10, it can be seen that a slight movement of the piston 22 to the right or left from that position will effect interconnection between various of the passage means. Because of the close tolerences of the sealing pin means 47, 48, and 49, with respect to the passage means 31—35, accuracy must be maintained to prevent leakage. When the piston 22 is in its predetermined position relative to the housing 10, only pin means 48 is subject to leakage therearound as only passage means 33 is directing fluid to the control valve A at this time as will later be explained. Therefore, by positioning the pin means 47, 48, and 49 in the manner above described, it can be seen that a relatively small and yet accurate control or servo valve may be made which has the advantage of being less susceptible to leakage than conventional servo valves.

Although the piston 22, passage means 31—35, and pin means 47, 48, and 49 have been described as being cylindrical, it is to be understood that they may have any configuration as long as the pin means are adapted to prevent and permit fluid communication in the later to be described manner.

The controlled valve C comprises a bore 52 formed in a housing 53 and is provided with an axially movable piston 54 disposed within the bore 52. The piston 54 has a plurality of spaced enlarged lands 55, 56, 57, and 58 formed thereon, the lands 55 and 58 being formed at the respective ends of the piston 54 and the lands 56 and 57 being formed on the piston 54 intermediate and spaced from the lands 55 and 58 and from one another. Land 55 defines with one end of the bore 52 a pressure receiving chamber 59 and land 58 defines with the other end of the bore 52 and other pressure receiving chamber 60. Chambers 59 and 60 are later referred to as utilization means as will become apparent upon a reading of the operation of the system which is later presented. Lands 55 and 56 cooperate with the bore 52 to define a chamber 61 therebetween, lands 56 and 57 cooperate with the bore 52 to define a chamber 62 therebetween, and lands 57 and 58 also cooperate with the bore 52 to define a chamber 63 therebetween. Chamber 61 is fluidly connected to a sump S by means of a passage means 64 formed in the housing 53 which interconnects a passage means 65, shown schematically, that is, in turn, fluidly connected to the sump S. Chamber 62 is fluidly interconnected with the pressure fluid source B by means of a passage means 66 connected to the source B at one end thereof and to a passage means 67 formed in the housing 53 at the other end thereof. Chamber 62 is also fluidly interconnected with the passage means 33 of the control valve A by means of a passage means 68 formed in the housing 58 and an interconnecting passage means 69. Chamber 63 is fluidly interconnected with the sump S by means of a passage means 70 formed in the housing 53 which is in turn fluidly interconnected with the passage means 65.

Passage means 31 and 35 of the control valve A are fluidly interconnected to conduit 65 by passage means 71 and 72 respectively. Passage means 32 and 34 of the control valve A are respectively interconnected with chambers 59 and 60 by passage means 73 and 74.

A pair of spaced passage means 75 and 76 are formed in the housing 53 of the control valve C and are respectively interconnected with the left and right sides of the motor M by conduit means 77 and 78. When piston 54 of the controlled valve C is in its null position, i.e. when piston 54 is fully centered with respect to the bore 52 of housing 53, lands 56 and 57 respectively prevent fluid communication between either chamber 61 or 62 and passage means 75 and between either chamber 62 or 63 and passage means 76.

A flow sensor device F is disposed in fluid communication with the conduit means 78 at a point intermediate the passage means 76 of the housing 53 and the right side of the motor M. The flow sensor device F comprises a housing 79 having a chamber 80 formed therein, defined by a bore 81. The conduit or passage means 78 fluidly interconnects the upper end of chamber 80 by means of a passage means 82 formed in the housing 79. The lower end of the chamber 80 is, in turn, fluidly interconnected with the right side of motor M by a passage means 83 formed in the housing 79. A plate 84 is disposed intermediate the upper and lower ends of chamber 80 and is provided with a central aperture 85 therein. Plate 84 divides chamber 80 into an upper chamber 86 and a lower chamber 87. A baffle 88 is adapted to be telescopically received within the aperture 85 of the plate 84 and is retained in a position tending to prevent fluid communication between the upper chamber 86 and lower chamber 87 of the flow sensor device F by opposed spring means 89 and 90. The upper chamber 86 is fluidly interconnected with chamber 21 of the control valve A by a conduit means 91 interconnected with chamber 86 at one end thereof and with an inlet passage 92 formed in the end cap 19 at the other end thereof. The lower chamber 87 is fluidly interconnected with chamber 20 of the control valve A by a conduit means 93 interconnected with chamber 87 at one end thereof and an inlet passage means 94 formed in the end cap 18 at the other end thereof.

As previously stated, it is desirable to hydraulically balance the piston 22 of the control valve A in order to prevent the hydraulic pressure fluid controlled thereby from effecting the lateral movement of the piston 22. One means of hydraulically balancing the piston 22 is illustrated in FIGURE 2. A plurality of spaced parallel passages 95 are formed in the valve housing 10, each passage 95 being disposed perpendicular to and interconnected with the respective passages 31—35 intermediate the mounting surface 36 and the bore 17. A plurality of passages 96, similar to the passages 95, are formed in the housing 10 and each are interconnected respectively with the passages 31—35 intermediate the top surface 37 and the bore 17. A plurality of passages 97 are formed in the housing 10 and each are disposed perpendicular to the passages 95 and 96 and respectively interconnect the passages 95 and 96 together. The passages 95, 96, and 97 are formed in the housing 10 in a manner to facilitate ease of production, such as by drilling, and a plurality of pins 98 are disposed in each end of the passages 95, 96, and 97. It can be seen that each passage 31—35 includes an interconnected network of passages 95, 96, and 97 thereby permitting each passage 31—35 to be interconnected with the bore 17 at opposed points whereby each passage 31—35 is adapted to be simultaneously interconnected with appropriate pairs of sections 50, 50$^1$ or 51, 51$^1$ when the piston 22 is axially moved. In this manner the piston 22 is adapted to be hydraulically balanced, i.e., when hydraulic pressure fluid is delivered to section 50 or 51 of the groove 46 it is also delivered to the corresponding section 50$^1$ or 51$^1$ of the groove 46$^1$ by the respective passages 95, 96, and 97. If pressure fluid is not directed simultaneously to the corresponding sections 50, 50$^1$ or 51, 51$^1$, it can be seen that the pressure fluid directed only to the sections 50 or 51 would tend to force the piston 22 upwardly into frictional engagement with the internal surface of the housing 10 thereby hindering accurate axial movement of the piston 22 relative to the housing 10 in response to the control signals fed to either torque motor T and T$^1$. This hydraulic "sticking" of the piston 22 within the bore 17 is prevented by providing means for hydraulically balancing the piston 22, such as described above, whereby the hydraulic pressure fluid directed by the control valve A has no effect on the function thereof.

The operation of the hydraulic system depicted in FIGURE 1 is as follows: Assuming that the electronic computer, which is to determine the operation of the motor M, concludes that the piston of motor M should be moved to the left, as viewed in the drawing, the computer sends an elecrtical impulse signal to the torque motor T$^1$. The strength of the electrical signal determines the extent of desired displacement of the piston of motor M. Torque motor T$^1$, thus energized, causes movement of the armature 28 toward the torque motor T$^1$ effecting axial movement of the piston 22 of the control valve A to the right. Movement of the piston 22 to the right permits pressure fluid from the source B to pass through passage means 33 into section 50 of the piston 22 and out through passage means 32. This flow of fluid pressure passes from passage means 32 through passage means 73 to the chamber or utilization means 59 of the controlled valve C. The force of the pressure fluid within chamber or utilization means 59 causes axial movement of the piston 54 thereof to the right. Any pressure fluid within the chamber or utilization means 60 of the controlled valve C will be discharged by movement of the piston 54 to the right forcing the pressure fluid through conduit means 74, passage means 34 of the control valve A, section 51 of the piston 22, and out through passage means 35 to the sump S by means of passage means 72 and 65. Movement of the piston 54 of the controlled valve C to the right effects fluid communication between the source of pressure fluid B, through passage means 66 and 67, chamber 62, and passage means 76, with the conduit means 78. The fluid pressure delivered by conduit means 78 to the flow sensor device F enters the upper chamber 86 and causes movement of the shuttle or baffle device 88 downwardly to permit the fluid within chamber 86 to pass through the aperture 85 into the lower chamber 87 and subsequently to the right side of the motor M effecting movement of the piston thereof to the left. This leftward movement of the piston of the motor M causes the pressure fluid at the left side of the piston of the motor M to be expelled through conduit means 77, passage means 75, chamber 61, passage means 64, and passage means 65 to the sump S.

Since the fluid from the source B is flowing through conduit means 78 by movement of the controlled valve C to the right, the pressure within the upper chamber 86 of the flow sensor device F is greater than the pressure within the lower chamber 87. This differential in pressure is caused by the restricted orifice in the flow sensor device F, formed by the relation of the shuttle device 88 with respect to the aperture 85 of the plate 84. Since chamber 20 of the control valve A senses the pressure in the lower chamber 87 of the flow sensor device F and chamber 21 thereof senses the pressure of the upper chamber 86, the pressure fluid within chamber 20 is lower in pressure value than that within chamber 21. Therefore, the pressure differential existing between chamber 20 and 21 is such that the force of the pressure fluid within chamber 21 acting on the end 24 of the piston 22 and the armature 28 causes movement of the piston 22 to the left in opposition to the force of the torque motor $T^1$ tending to maintain the piston 22 in its displaced position to the right. This feed back arrangement of chambers 20 and 21 permits a close regulation of the control valve A in response to the flow of the pressure fluid directed by the controlled valve C to the motor M.

When the piston of motor M has moved to the left a sufficient distance to satisfy the requirements of the electronic computer, the electrical impulse directed to torque motor $T^1$ is terminated by the computer and the force of the pressure fluid within chamber 21 acting on the end 24 of the piston 22 and the armature 28 moves the piston 22 to the left past its null position in opposition to the force of the springs 29 and 30 tending to maintain the piston 22 in its predetermined position, i.e. its null position. When the piston 22 is moved to the left the pressure fluid from passage means 33 is fluidly interconnected through section 51 with passage means 34 and subsequently with the chamber or utilization means 60 through passage means 74. Chamber or utilization means 59 is now connected with the sump S by passage means 73 and 32, section 50, and passage means 31, 71, and 65. The force of the pressure fluid within chamber 60 acting on the end of land 58 then returns piston 54 toward its null position. When piston 54 is in its null position, no pressure fluid is flowing through the flow sensor device F whereby the pressure values of the pressure fluids within the upper chamber 86 and the lower chamber 87 thereof are equal causing the pressure values of the pressure fluid within chambers 20 and 21 of the control valve A also to be equal. Since the respective pressure values of the pressure fluids within chambers 20 and 21 are now equal, the springs 29 and 30 of the control valve A are adapted to position the piston 22 to its null or predetermined position and the system remains as shown in FIGURE 1 until the torque motors T and $T^1$ receive another electrical signal effecting a change therein as above described.

When the motor M is desired to be moved to the right by the electronic computer, an electrical impulse is directed to torque motor T and the converse in operation occurs in substantially the same manner as that presented above when the impulse is directed to torque motor $T^1$. It is to be understood that upon actuation of torque motor T the flow of pressure fluid from source B to the motor M is through conduit means 77 and from the motor M through conduit means 78, flow sensor device F to the sump S.

As can be seen, there has been disclosed a control valve or servo valve which is relatively simple to manufacture yet effective to cause amplification of relatively weak electrical signals and convert same into a hydraulic control signal to effect movement of a hydraulic valve and the subsequent movement of the utilization device in accordance with the electrical signal.

While the servo valve A has been disclosed as being utilized as operating a controlled valve C, it is to be understood that the control valve A may be utilized in many different applications in which a controlled valve is not used, the control valve directly effecting movement of a utilization device or devices.

While the various parts of this invention have been referred to as being located in the upper or lower, right or left, position and moving to the right or left, and upwardly or downwardly, it will be understood that this is done solely for the purpose of facilitating description, and such references relate only to the relative positions or movements of the parts as shown in the accompanying drawing.

Also, it is to be understood that many changes and modifications may be made to the structure of the valve disclosed without departing from the spirit and scope of the invention which is defined by the appended claims.

What is claimed is:

1. A fluid control valve device comprising: a housing having a bore therein; means defining a plurality of spaced passage means disposed in said housing interconnecting said bore with the exterior of said housing, said passage means including at least one passage means and a pair of passage means being so disposed whereby each passage means of said pair is disposed adjacent to said one passage means; movable piston means disposed in said bore, said piston means having medial recess means formed therein; biasing means carried by said housing tending to maintain said piston means in a predetermined position relative to said housing; pin means carried by said piston means dividing said recess means into sections, one of said pin means being adapted to prevent fluid communication between said one passage means and each passage means of said pair of passage means when said piston means is in said predetermined position; and means carried by said housing being adapted to cause selected axial movement of said piston means relative to said housing in opposition to said biasing means whereby said pin means permits certain of said sections to fluidly interconnect said one passage means with one of the passage means of said pair of passage means.

2. A fluid control valve device comprising: a housing having a bore therein; means defining a plurality of spaced passage means disposed in said housing interconnecting said bore with the exterior of said housing, said passage means including at least one passage means and a pair of passage means being so disposed whereby each passage means of said pair is disposed adjacent to said one passage means; movable piston means disposed in said bore, said piston means having medial recess means formed therein; biasing means carried by said housing tending to maintain said piston means in a predetermined position relative to said housing; means defining a transverse bore in said piston means passing through said recess means; pin means being disposed in said transverse bore of said piston means dividing said recess means into sections, one of said pin means being adapted to prevent fluid communication between said one passage means and each passage means of said pair of passage means when said piston means is in said predetermined position; and means carried by said housing being adapted to cause selected axial movement of said piston means relative to said housing in opposition to said biasing means whereby said pin means permits certain of said sections to fluidly interconnect said one passage means with one of the passage means of said pair of passage means.

3. A fluid control valve device comprising: a housing having a bore therein; means defining a plurality of spaced, substantially parallel passage means disposed in said housing interconnecting said bore with the exterior of said housing, said passage means including at least one passage means and a pair of passage means being so disposed whereby each passage means of said pair is disposed adjacent to said one passage means; movable piston means disposed in said bore, said piston means having a pair of opposed medial recess means formed therein; biasing means carried by said housing tending to maintain said piston means in a predetermined position relative to said housing; means defining a transverse bore in said piston means passing through said recess means; pin means being disposed in said transverse bore of said piston means dividing said recess means into two pairs of sections, one of said pin means being adapted to prevent fluid communication between said one passage means and each passage means of said pair of passage means when said piston means is in said predetermined position; and means carried by said housing being adapted to cause selected axial movement of said piston means relative to said housing in opposition to said biasing means whereby said pin means permits one pair of said sections to fluidly interconnect said one passage means with one of the passage means of said pair of passage means.

4. A fluid control valve device being adapted to selectively interconnect one of a pair of utilization means with a pressure fluid source comprising: a housing having a bore therein; means defining a plurality of spaced passage means disposed in said housing interconnecting said bore with the exterior of said housing, said passage means including at least one passage means and a pair of passage means being so disposed whereby each passage means of said pair is disposed adjacent to said one passage means; means fluidly interconnecting said one passage means with said pressure fluid source; means fluidly interconnecting each passage means of said pair of passage means with each of said utilization means; movable piston means disposed in said bore, said piston means having medial recess means formed therein; biasing means carried by said housing tending to maintain said piston means in a predetermined position relative to said housing; pin means carried by said piston means dividing said recess means into sections, one of said pin means being adapted to prevent fluid communication between said one passage means and each passage means of said pair of passage means when said piston means is in said predetermined position; and means carried by said housing being adapted to cause selected axial movement of said piston means relative to said housing in opposition to said biasing means whereby said pins means permits certain of said sections to fluidly interconnect said one passage means with one of the passage means of said pair of passage means to thereby interconnect one of said utilization means with said pressure fluid source.

5. A fluid control valve device being adapted to selectively interconnect one of a pair of utilization means with a pressure fluid source comprising: a housing having a bore therein; means defining a plurality of spaced passage means disposed in said housing interconnecting said bore with the exterior of said housing, said passage means including at least one passage means and a pair of passage means being so disposed whereby each passage means of said pair is disposed adjacent to said one passage means; means fluidly interconnecting said one passage means with said pressure fluid source; means fluidly interconnecting each passage means of said pair of passage means with each of said utilization means; movable piston means disposed in said bore, said piston means having medial recess means formed therein; biasing means carried by said housing tending to maintain said piston means in a predetermined position relative to said housing; means defining a transverse bore in said piston means passing through said recess means; pin means being disposed in said transverse bore of said piston means dividing said recess means into sections, one of said pin means being adapted to prevent fluid communication between said one passage means and each passage means of said pair of passage means when said piston means is in said predetermined position; and means carried by said housing being adapted to cause selected axial movement of said piston means relative to said housing in opposition to said biasing means whereby said pin means permits certain of said sections to fluidly interconnect said one passage means with one of the passage means of said pair of passage means to thereby interconnect one of said utilization means with said pressure fluid source.

6. A fluid control valve device being adapted to selectively interconnect one of a pair of utilization means with a pressure fluid source comprising: a housing having a bore therein; means defining a plurality of spaced, substantially parallel passage means disposed in said housing interconnecting said bore with the exterior of said housing, said passage means including at least one passage means and a pair of passage means being so disposed whereby each passage means of said pair is disposed adjacent to said one passage means; means fluidly interconnecting said one passage means with said pressure fluid source; means fluidly interconnecting each passage means of said pair of passage means with each of said utilization means; movable piston means disposed in said bore, said piston means having a pair of opposed medial recess means formed therein; biasing means carried by said housing tending to maintain said piston means in a predetermined position relative to said housing; means defining a transverse bore in said piston means passing through said recess means; pin means being disposed in said transverse bore of said piston means dividing said recess means into two pairs of sections, one of said pin means being adapted to prevent fluid communication between said one passage means and each passage means of said pair of passage means when said piston means is in said predetermined position; and means carried by said housing being adapted to cause selected axial movement of said piston means relative to said housing in opposition to said biasing means whereby said pin means permits one pair of said sections to fluidly interconnect said one passage means with one of the passage means of said pair of passage means to thereby interconnect one of said utilization means with said pressure fluid source.

7. A fluid control valve device comprising: a housing having a bore therein; means defining a plurality of spaced passage means disposed in said housing interconnecting said bore with the exterior of said housing, said passage means including at least one passage means, a first pair of passage means and a second pair of passage means being so disposed whereby each passage means of said first pair of passage means is disposed adjacent to said one passage means and each passage means of said second pair of passage means is disposed remote from said one passage means and adjacent to one of the passage means of said first pair of passage means; movable piston means disposed in said bore, said piston means having medial recess means formed therein; biasing means carried by said housing tending to maintain said piston means in a predetermined position relative to said housing; a plurality of spaced pin means carried by said piston means dividing said recess means into sections, said pin means being so spaced that when said piston means is in said predetermined position one of said pin means prevents fluid communication between said one passage means and each passage means of said first pair of passage means and other of said pin means prevent fluid communication between each passage means of said first pair of passage means and its adjacent passage means of said second pair of passage means; and means carried by said housing adapted to cause selected axial movement of said piston means relative to said housing in opposition to said biasing means whereby said pin means permits certain of said sections to fluidly interconnect said one passage means with one of the passage means of said first pair of passage means and permits others of said sections to fluidly interconnect the other passage means of said first pair of passage means with its said adjacent passage means of said second pair of passage means.

8. A fluid control valve device comprising: a housing having a bore therein; means defining a plurality of spaced passage means disposed in said housing interconnecting said bore with the exterior of said housing, said passage means including at least one passage means, a first pair of passage means and a second pair of passage means being so disposed whereby each passage means of said first pair of passage means is disposed adjacent to said one passage means and each passage means of said second pair of passage means is disposed remote from said one passage means and adjacent to one of the passage means of said first pair of passage means; movable piston means disposed in said bore, said piston means having medial recess means formed therein; biasing means carried by said housing tending to maintain said piston means in a predetermined position relative to said housing; means defining a plurality of spaced transverse bores in said piston means passing through said recess means; a plurality of pin means, each of said pin means being disposed in one of said transverse bores of said piston means dividing said recess means into sections, said pin means being so spaced that when said piston means is in said predetermined position one of said pin means prevents fluid communication between said one passage means and each passage means of said first pair of passage means and other of said pin means prevent fluid communication between each passage means of said first pair of passage means and its adjacent passage means of said second pair of passage means; and means carried by said housing adapted to cause selected axial movement of said piston means relative to said housing in opposition to said biasing means whereby said pin means permits certain of said sections to fluidly interconnect said one passage means with one of the passage means of said first pair of passage means and permits others of said sections to fluidly interconnect the other passage means of said first pair of passage means with its said adjacent passage means of said second pair of passage means.

9. A fluid control valve device comprising: a housing having a bore therein; means defining a plurality of spaced, substantially parallel passage means disposed in said housing interconnecting said bore with the exterior of said housing, said passage means including at least one passage means, a first pair of passage means and a second pair of passage means being so disposed whereby each passage means of said first pair of passage means is disposed adjacent to said one passage means and each passage means of said second pair of passage means is disposed remote from said one passage means and adjacent to one of the passage means of said first pair of passage means; movable piston means disposed in said bore, said piston means having a pair of opposed medial recess means formed therein; biasing means carried by said housing tending to maintain said piston means in a predetermined position relative to said housing; means defining a plurality of spaced transverse bores in said piston means passing through said recess means; a plurality of pin means, each of said pin means being disposed in one of said transverse bores of said piston means dividing said recess means into two pairs of sections, said pin means being so spaced that when said piston means is in said predetermined position one of said pin means prevents fluid communication between said one passage means and each passage means of said first pair of passage means and other of said pin means prevent fluid communication between each passage means of said first pair of passage means and its adjacent passage means of said second pair of passage means; and means carried by said housing adapted to cause selected axial movement of said piston means relative to said housing in opposition to said biasing means whereby said pin means permits one pair of said sections to fluidly interconnect said one passage means with one of the passage means of said first pair of passage means and permits the other pair of said sections to fluidly interconnect the other passage means of said first pair of passage means with its said adjacent passage means of said second pair of passage means.

10. A fluid control valve device being adapted to selectively interconnect one of two utilization means with a pressure fluid source and simultaneously interconnect the other of said utilization means with a sump comprising: a housing having a bore therein; means defining a plurality of spaced passage means disposed in said housing interconnecting said bore with the exterior of said housing, said passage means including at least one passage means, a first pair of passage means and a second pair of passage means being so disposed whereby each passage means of said first pair of passage means is disposed adjacent to said one passage means and each passage means of said second pair of passage means is disposed remote from said one passage means and adjacent to one of the passage means of said first pair of passage means; means fluidly interconnecting said one passage means with said pressure fluid source; means fluidly interconnecting each passage means of said first pair of passage means with each of said utilization means; means fluidly interconnecting each passage means of said second pair of passage means with said sump; movable piston means disposed in said bore, said piston means having medial recess means formed therein; biasing means carried by said housing tending to maintain said piston means in a predetermined position relative to said housing; a plurality of spaced pin means carried by said piston means dividing said recess means into sections, said pin means being so spaced that when said piston means is in said predetermined position one of said pin means prevents fluid communication between said one passage means and each passage means of said first pair of passage means and other of said pin means prevent fluid communication between each passage means of said first pair of passage means and its adjacent passage means of said second pair of passage means; and means carried by said housing adapted to cause selected axial movement of said piston means relative to said housing in opposition to said biasing means whereby said pin means permits certain of said sections to fluidly interconnect said one passage means with one of the passage means of said first pair of passage means and permits others of said sections to fluidly interconnect the other passage means of said first pair of passage means with its said adjacent passage means of said second pair of passage means to thereby fluidly interconnect one of said utilization means with said pressure fluid source and the other of said utilization means with said sump.

11. A fluid control valve device being adapted to selectively interconnect one of two utilization means with a pressure fluid source and simultaneously interconnect the other of said utilization means with a sump comprising: a housing having a bore therein; means defining a plurality of spaced passage means disposed in said housing interconnecting said bore with the exterior of said housing, said passage means including at least one passage means, a first pair of passage means and a second pair of passage means being so disposed whereby each passage means of said first pair of passage means is disposed adjacent to said one passage means and each passage means of said second pair of passage means is disposed remote from said one passage means and adjacent to one of the passage means of said first pair of passage means; means fluidly interconnecting said one passage means with said pressure fluid source; means fluidly interconnecting each passage means of said first pair of passage means with each of said utilization means; means fluidly interconnecting each passage means of said second pair of passage means with said sump; movable piston means disposed in said bore, said piston means having medial recess means formed therein; biasing means carried by said housing tending to maintain said piston means in a predetermined position relative to said housing; means defining a plurality of spaced transverse bores in said piston means passing through said recess means; a plurality of pin means, each of said pin means being disposed in one of said transverse bores of said piston means dividing said recess means into sections, said pin means being so spaced that when said piston means is in said predetermined position one of said pin means prevents fluid communication between said one passage means and each passage means of said first pair of passage means and other of said pin means prevent fluid communication between each passage means of said first pair of passage means and its adjacent passage means of said second pair of passage means; and means carried by said housing adapted to cause selected axial movement of said piston means relative to said housing in opposition to said biasing means whereby said pin means permits certain of said sections to fluidly interconnect said one passage means with one of the passage means of said first pair of passage means and permits others of said sections to fluidly interconnect the other passage means of said first pair of passage means with its said adjacent passage means of said second pair of passage means to thereby fluidly interconnect one of said utilization means with said pressure fluid source and the other of said utilization means with said sump.

12. A fluid control valve device being adapted to selectively interconnect one of two utilization means with a pressure fluid source and simultaneously interconnect the other of said utilization means with a sump comprising: a housing having a bore therein; means defining a plurality of spaced, substantially parallel passage means disposed in said housing interconnecting said bore with the exterior of said housing, said passage means including at least one passage means, a first pair of passage means and a second pair of passage means being so disposed whereby each passage means of said first pair of passage means is disposed adjacent to said one passage means and each passage means of said second pair of passage means is disposed remote from said one passage means and adjacent to one of the passage means of said first pair of passage means; means fluidly interconnecting said one passage means with said pressure fluid source; means fluidly interconnecting each passage means of said first pair of passage means with each of said utilization means; means fluidly interconnecting each passage means of said second pair of passage means with said sump; movable piston means disposed in said bore, said piston means having a pair of opposed medial recess means formed therein; biasing means carried by said housing tending to maintain said piston means in a predetermined position relative to said housing; means defining a plurality of spaced transverse bores in said piston means passing through said recess means; a plurality of pin means, each of said pin means being disposed in one of said transverse bores of said piston means dividing said recess means into at least two pairs of sections, said pin means being so spaced that when said piston means is in said predetermined position one of said pin means prevents fluid communication between said one passage means and each passage means of said first pair of passage means and other of said pin means prevent fluid communication between each passage means of said first pair of passage means and its adjacent passage means of said second pair of passage means; and means carried by said housing adapted to cause selected axial movement of said piston means relative to said housing in opposition to said biasing means whereby said pin means permits one pair of said sections to fluidly interconnect said one passage means with one of the passage means of said first pair of passage means and permits the other pair of said sections to fluidly interconnect the other passage means of said first pair of passage means with its said adjacent passage means of said second pair of passage means to thereby fluidly interconnect one of said utilization means with said pressure fluid source and the other of said utilization means with the sump.

References Cited in the file of this patent
UNITED STATES PATENTS

| | | |
|---|---|---|
| 2,591,800 | Gardiner | Apr. 8, 1952 |
| 2,616,449 | Maha | Nov. 4, 1952 |
| 2,731,980 | Diefenderfer | Jan. 24, 1956 |
| 2,853,976 | Gerwig et al. | Sept. 30, 1958 |
| 2,875,782 | Shih-Ying Lee | Mar. 3, 1959 |
| 2,909,195 | Keyt | Oct. 20, 1959 |
| 2,920,650 | Moog | Jan. 12, 1960 |